US012632812B2

(12) United States Patent
Thiemann et al.

(10) Patent No.: US 12,632,812 B2
(45) Date of Patent: May 19, 2026

(54) CUSTOMIZABLE STATE-MACHINE-BASED EVENT PROCESSING

(71) Applicant: Stripe, LLC, South San Francisco, CA (US)

(72) Inventors: Alexander Thiemann, San Francisco, CA (US); Calvin Grunewald, Gilbert, AZ (US); Jason Horman, Carlsbad, CA (US); Dmitry Alexeenko, Seattle, WA (US)

(73) Assignee: Stripe, LLC, South San Francisco, CA (US)

( * ) Notice: Subject to any disclaimer, the term of this patent is extended or adjusted under 35 U.S.C. 154(b) by 60 days.

(21) Appl. No.: 18/506,785

(22) Filed: Nov. 10, 2023

(65) Prior Publication Data

US 2025/0156784 A1 May 15, 2025

(51) Int. Cl.
*G06Q 10/00* (2026.01)
*G06Q 10/0633* (2023.01)
(52) U.S. Cl.
CPC .................................. *G06Q 10/0633* (2013.01)
(58) Field of Classification Search
CPC .............................. G06Q 10/00; G06Q 50/00
USPC ........................................................ 705/7.27
See application file for complete search history.

(56) References Cited

U.S. PATENT DOCUMENTS

| | | | | |
|---|---|---|---|---|
| 11,074,048 B1 * | 7/2021 | Wilson-Thomas | ....... | G06F 8/34 |
| 11,971,804 B1 * | 4/2024 | Pandurangarao | ......... | G06F 8/33 |
| 2013/0152021 A1 * | 6/2013 | Hatfield | ............ | G06Q 10/0633 |
| | | | | 715/810 |
| 2013/0246106 A1 * | 9/2013 | Kroetsch | ................ | G06Q 10/06 |
| | | | | 705/7.12 |
| 2018/0032980 A1 * | 2/2018 | Rodriguez | ........... | G06Q 20/102 |
| 2020/0234242 A1 * | 7/2020 | Parks | ........................ | G06F 8/34 |

* cited by examiner

*Primary Examiner* — Mustafa Iqbal
(74) *Attorney, Agent, or Firm* — BAKERHOSTETLER

(57) ABSTRACT

Aspects of the subject technology include receiving a request to generate an event-based workflow associated with a first event type, which includes a state machine that includes at least a state and an associated transition and receiving an event including a second event type and an event attribute. Aspects also include determining whether the event attribute satisfies the triggering condition of the transition associated with the state, in response to determining that the second event type corresponds to the first event type, and when a current state of the event-based workflow corresponds to the state. Aspects also include performing the transition action of the transition and updating the current state based at least in part on the performed transition action, in response to determining that the event attribute satisfies the triggering condition of the transition associated with the state.

20 Claims, 8 Drawing Sheets

300

400

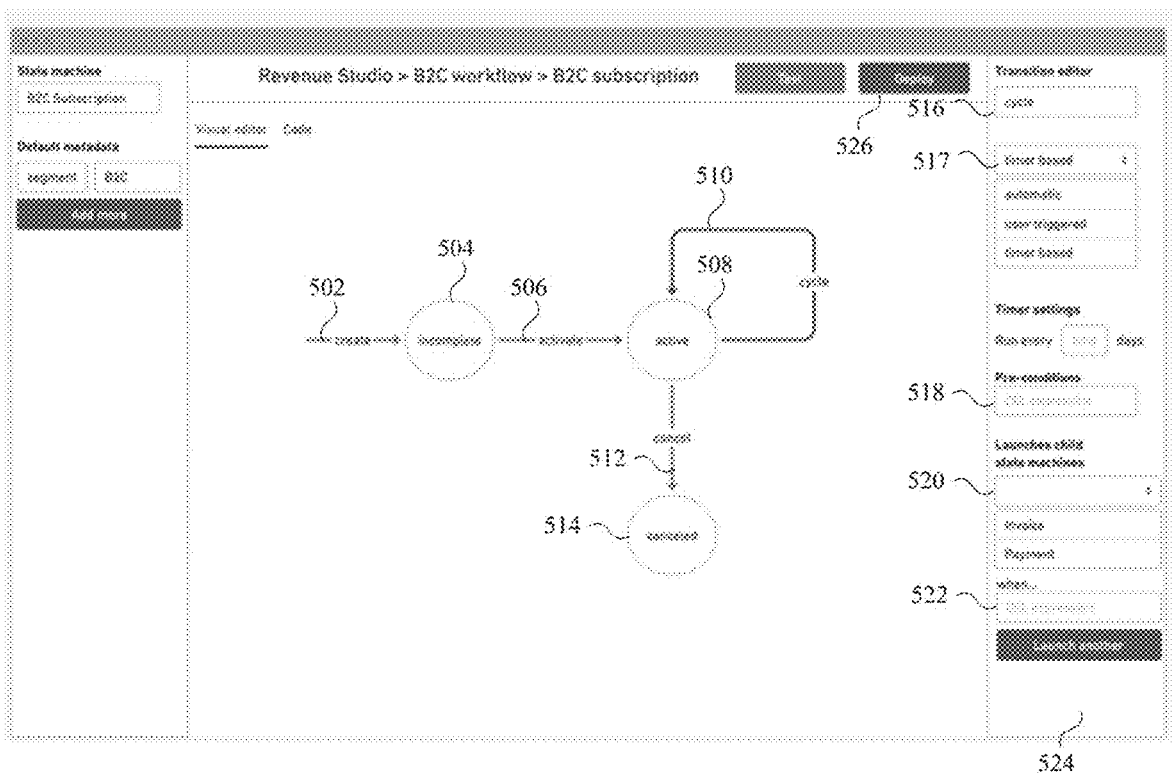
*FIG. 5*

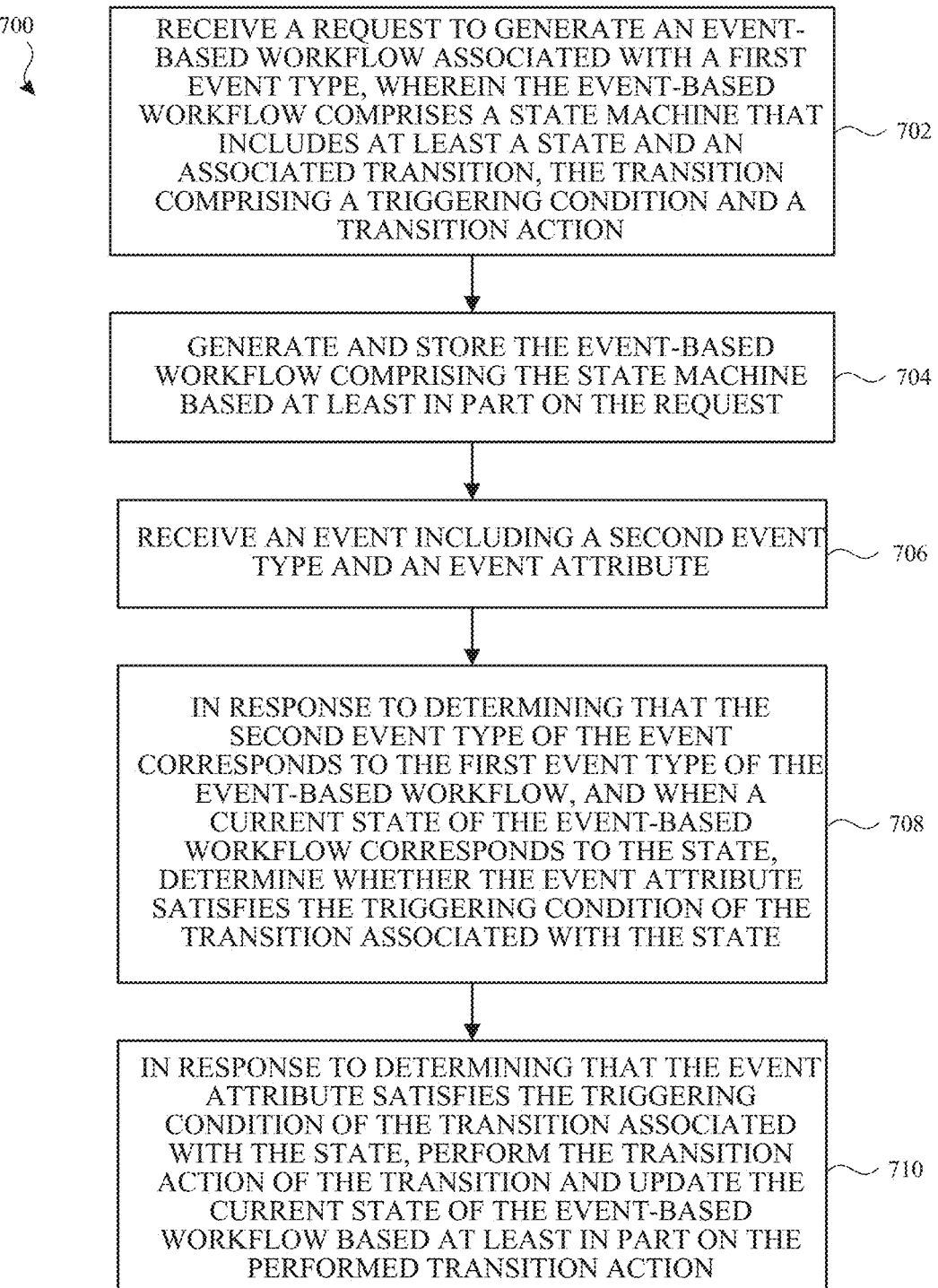

700

RECEIVE A REQUEST TO GENERATE AN EVENT-BASED WORKFLOW ASSOCIATED WITH A FIRST EVENT TYPE, WHEREIN THE EVENT-BASED WORKFLOW COMPRISES A STATE MACHINE THAT INCLUDES AT LEAST A STATE AND AN ASSOCIATED TRANSITION, THE TRANSITION COMPRISING A TRIGGERING CONDITION AND A TRANSITION ACTION — 702

GENERATE AND STORE THE EVENT-BASED WORKFLOW COMPRISING THE STATE MACHINE BASED AT LEAST IN PART ON THE REQUEST — 704

RECEIVE AN EVENT INCLUDING A SECOND EVENT TYPE AND AN EVENT ATTRIBUTE — 706

IN RESPONSE TO DETERMINING THAT THE SECOND EVENT TYPE OF THE EVENT CORRESPONDS TO THE FIRST EVENT TYPE OF THE EVENT-BASED WORKFLOW, AND WHEN A CURRENT STATE OF THE EVENT-BASED WORKFLOW CORRESPONDS TO THE STATE, DETERMINE WHETHER THE EVENT ATTRIBUTE SATISFIES THE TRIGGERING CONDITION OF THE TRANSITION ASSOCIATED WITH THE STATE — 708

IN RESPONSE TO DETERMINING THAT THE EVENT ATTRIBUTE SATISFIES THE TRIGGERING CONDITION OF THE TRANSITION ASSOCIATED WITH THE STATE, PERFORM THE TRANSITION ACTION OF THE TRANSITION AND UPDATE THE CURRENT STATE OF THE EVENT-BASED WORKFLOW BASED AT LEAST IN PART ON THE PERFORMED TRANSITION ACTION — 710

*FIG. 7*

CUSTOMIZABLE STATE-MACHINE-BASED EVENT PROCESSING

TECHNICAL FIELD

The present description generally relates to digital event processing and, more particularly, to techniques for creating customizable state-machine-based event processing.

BACKGROUND

In the digital commerce environment, entities with intricate billing architectures may utilize automated workflows for digital event processing, for example, by managing and coordinating various tasks within a system. Automated workflows may be extended to interface with other systems to customize the workflows. However, customization of the workflows may be restricted by the functionalities and limitations of, for example, vendor-specific application programming interfaces (APIs). While APIs may provide some customizability or flexibility, when merchants require functionalities outside the API's purview, they are left reliant on the vendor's willingness and capability to undertake developmental efforts to accommodate custom requests. Furthermore, many billing interfaces may present extensibility issues. Typically, billing workflows may come equipped with a pre-defined set of integrations, limiting flexibility. Deviations from these default integrations may require custom and/or complex developmental interventions (e.g., from the vendor), which may require technical expertise for programming software to tailor a workflow for a particular merchant.

BRIEF DESCRIPTION OF THE DRAWINGS

Certain features of the subject technology are set forth in the appended claims. However, for the purpose of explanation, several implementations of the subject technology are set forth in the following figures.

FIG. 5 depicts an example state machine graphical user interface, in accordance with one or more implementations.

FIG. 7 depicts a flow diagram of an example process for generating one or more event-based workflows, in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology described herein provides customized event-based workflows utilizing state machines that allows the workflow to dynamically adapt to new use cases that may not be covered by static APIs.

Aspects of the subject technology include a service that allows merchants to generate customized event-based workflows utilizing state machines without the merchants needing to edit or create programming code or computer code. Utilizing state machines allows the workflow to dynamically adapt to new use cases. In some examples, state machines may be modular which allows them to be combined within a particular workflow and re-used among workflows. With the subject technology, merchants may create customizable workflows including modular state machines that are responsive to specified events. One or more billing primitive (e.g., subscriptions, invoices, payments, refunds, discounts, obligations, etc.) may be expressed as a state machine, and an event-based workflow may be represented as a set of state machines operating together. State machines and components and/or attributes thereof (e.g., states, transitions, conditions, etc.) may be associated with code snippets so that customizing state machines may be done using a no-code UI (e.g., a UI that can be interacted with without editing or creating programming code).

In some implementations, the state machines may be pre-defined, but users can configure the state machines to meet their needs by modifying (e.g., adding, removing, or customizing) states, modifying transitions to/from states, changing the conditions for transitions, and the like. Users can also modify interactions to other state machines and/or third-party systems as part of state transitions.

Figure 1:
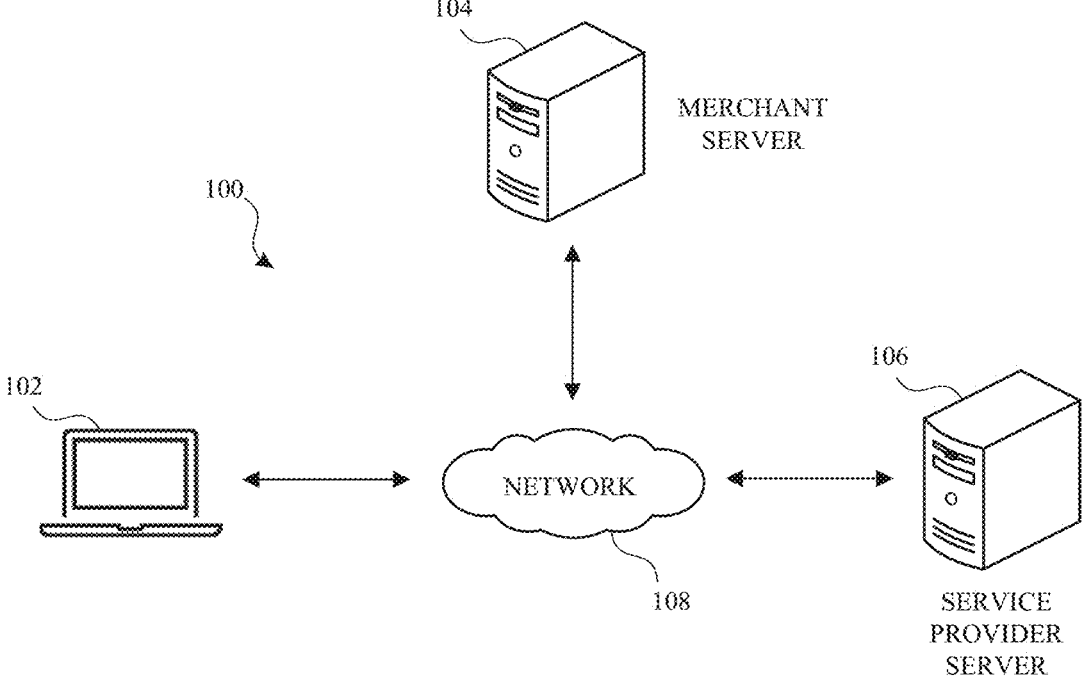
FIG. 1 illustrates an example network environment in which the subject technology may be implemented, in accordance with one or more implementations.

FIG. 1 illustrates an example network environment 100 in which the subject technology may be implemented, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, a merchant server 104, and a service provider server 106. The network 108 may communicatively (directly or indirectly) couple one or more of the electronic device 102, the merchant server 104, and the service provider server 106. In one or more implementations, the network 108 may be an interconnected network of devices that may include, or may be communicatively coupled to, the internet.

For explanatory purposes, the network environment 100 is illustrated in FIG. 1 as including the electronic device 102, the merchant server 104, and the service provider server 106; however, the network environment 100 may include any number of electronic devices and/or any number of servers communicatively coupled to each other directly or via the network 108. In addition, the various systems of FIG.

1 may be, and/or may include all or part of, the electronic system discussed below with respect to FIG. 8.

The electronic device 102 may be, for example, a wearable device (such as a watch, a band, and the like), a desktop computer, a portable computing device (e.g., a laptop computer), a smartphone, a peripheral device (e.g., a digital camera, headphones), a tablet device, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a laptop computer. The electronic device 102 may be associated with one or more accounts, credentials, or any other identity information registered with the service provider server 106 belonging to a user associated with the electronic device 102.

The service provider server 106 may be and/or may include, for example, one or more servers that host or facilitate a billing service that may be used by one or more entities (e.g., the electronic device 102). For example, the service provider server 106 may belong to a payment processor, and the service may include a billing service that may integrate with one or more merchants (e.g., the merchant server 104). The service provider server 106 may store account information (e.g., user account, usernames/handles, or any other account-specific data) associated with the electronic device 102 and/or users thereof and/or users associated therewith. The service provider server 106 may receive one or more requests from the electronic device 102 to customize one or more workflows and/or state machines thereof. The service provider server 106 may be, and/or may include all or part of, the electronic system discussed below with respect to FIG. 8.

The merchant server 104 (e.g., a web server) may be and/or may include, for example, one or more servers that host or facilitate a merchant service that may be used by one or more entities. For example, the merchant server 104 may belong to a merchant, and the service may include the sale and/or exchange of goods and/or services, which may be facilitated by one or more payment processors. The merchant server 104 may store account information (e.g., user account, usernames/handles, or any other account-specific data) associated with customers that interact with the merchant server 104. The merchant server 104 may be, and/or may include all or part of, the electronic system discussed below with respect to FIG. 8.

The merchant server 104 may also generate one or more events. An "event" refers to a digital record or notification generated by the merchant server 104 signifying an activity related to the buying and selling of goods and services, such as a payment, billing, or adjacent events. For example, a payment event may represent a financial exchange, such as a customer purchasing a product, a customer subscribing to a service, or any other form of transaction facilitated by the merchant. The event not only documents the activity but may also serve as a trigger for various downstream processes, such as inventory management, invoicing, financial reconciliation, and customer communication. An event may bridge the merchant's operations with a broader financial ecosystem (e.g., including the service provider server 106), ensuring that every transaction is accounted for, processed, and archived appropriately. Once identified (e.g., by the merchant server 104), an event may be sent to the service provider server 106 (e.g., to the billing platform operated by the payment processor).

Figure 2:
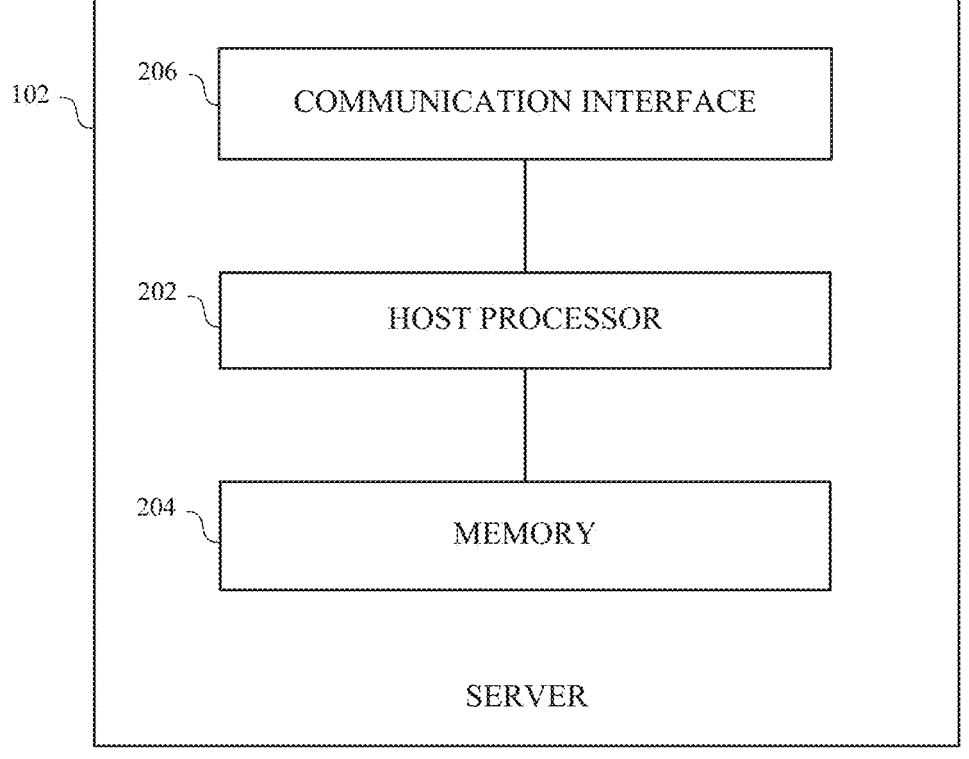
FIG. 2 depicts an example electronic device that may implement the subject technology, in accordance with one or more implementations.

FIG. 2 depicts an example electronic device 102 that may implement the subject technology, in accordance with one or more implementations. For explanatory purposes, FIG. 2 is primarily described herein with reference to the electronic device 102 of FIG. 1. However, this is merely illustrative, and features of the server of FIG. 2 may be implemented in any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The electronic device 102 may include one or more of a host processor 202, a memory 204, and/or a communication interface 206. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage).

The communication interface 206 may include suitable logic, circuitry, and/or code that enables wired or wireless communication, such as between the electronic device 102, the merchant server 104, the service provider server 106, and/or the electronic device 102. The communication interface 206 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the communication interface 206, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
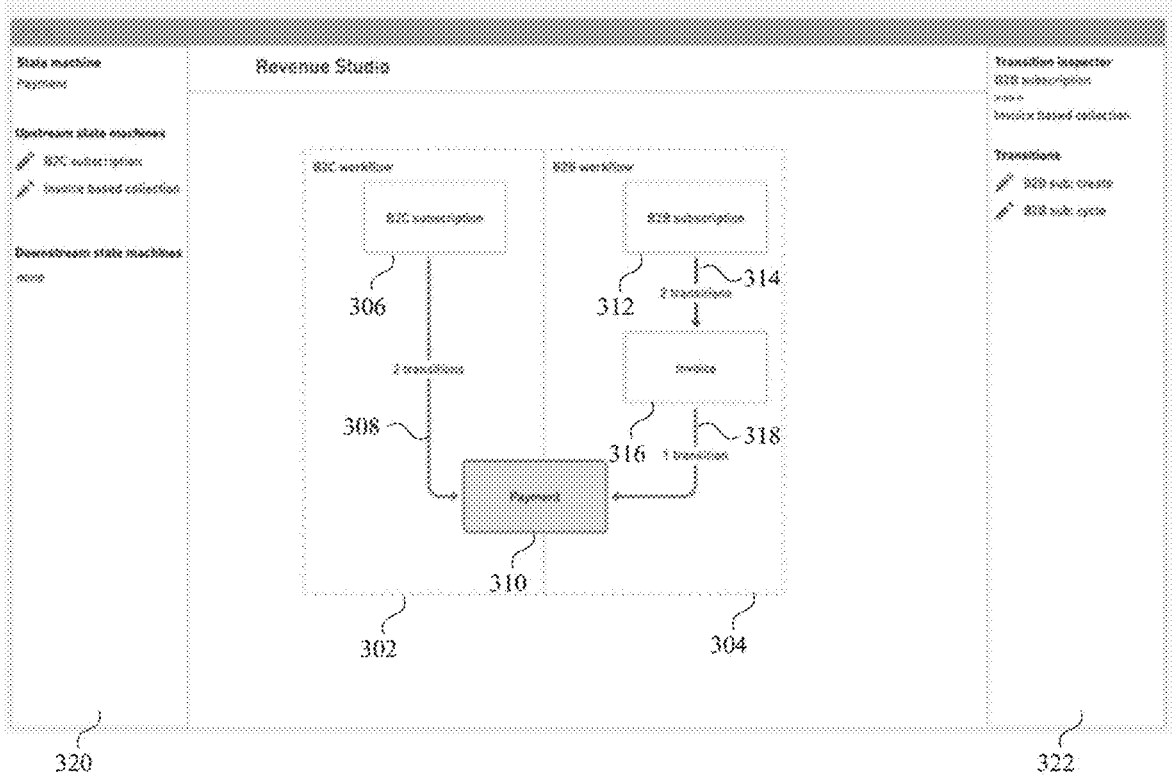
FIG. 3 depicts an example overview graphical user interface, in accordance with one or more implementations.

FIG. 3 depicts an example overview graphical user interface (overview GUI 300) that enables a user to build a custom workflow by visually depicting each of the state machines in the workflow, in accordance with one or more implementations. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The service provider server 106 may generate and/or provide an overview GUI 300 for creating, customizing, or otherwise modifying workflows, such as the workflows 302, 304. The overview GUI 300 may include interactive graphical elements, minimizing the need for coding or technical expertise. The overview GUI 300 offers a centralized location for a merchant to view and/or modify their workflows and/or components thereof (e.g., state machines) stored on the service provider server 106, which, for example, may reduce the number of requests that a merchant needs to send to the server to manage the workflows, thereby reducing the processing, memory, and/or communication resources needed to manage such workflows. The interactive aspect of the overview GUI 300 allows non-technical users to customize the workflows and/or state machines thereby conserving developer resources. The interactive aspects also provide added flexibility to perform modifications and updates to workflows without the need for a user to be proficient in coding and/or to delve into the code, as well as improve scalability by promoting code reusability.

The overview GUI 300 may include a visual canvas where a merchant can construct and adjust workflows 302, 304 and/or components thereof using a variety of graphical elements (e.g., blocks, arrows, buttons, checkboxes, input fields, and the like). The graphical elements (e.g., the blocks of B2B workflow 304, the B2B subscription state machine 312, the invoice state machine 316, and the payment state machine 310) of the overview GUI 300 may be moved (e.g., dragged and dropped), checked, interconnected (e.g., by the arrow of transitions 314, 318), or otherwise manipulated to define the logic of the workflows 302, 304.

The merchant can represent event processing primitives as state machines that can be used to generate a workflow and can be re-used across multiple workflows, thereby saving the merchant time in generating workflows that can accommodate more dynamic scenarios. Each state machine may include one or more states that each represent a specific condition or phase of the workflow. Associated with each state is at least one transition, which provides a mechanism to move from one state to another. Each transition may include a triggering condition that, when satisfied, activates the transition (e.g., initiates the change of state). For example, the triggering condition may include a custom conditional expression input by a merchant. Each transition may also include a transition action that delineates the specific operations or tasks to be executed when the transition is activated (e.g., the triggering conditions are satisfied). In some examples, the transition may activate and/or direct the workflow to another state machine, thereby logically connecting state machines together in modular fashion to perform a cohesive flow of actions.

For example, as shown in FIG. 3, a merchant can customize multiple workflows to automate the handling of digital events for business-to-consumer (B2C) sales and business-to-business (B2B) sales. Particularly, the overview GUI 300 depicts a B2C workflow 302 and a B2B workflow 304, one or more of which may be defined by the merchant. The overview GUI 300 may provide the merchant a summary of the operations to be performed by the merchant's workflows. The summary may include a view of the active state machines and their relationship with workflows and other state machines. For example, the B2C workflow 302 may include two state machines: a subscription state machine 306 and a payment state machine 310. The subscription state machine 306 may include two transitions 308 that direct the workflow 302 to the payment state machine 310. In addition, the B2B workflow 304 may include three state machines: a subscription state machine 312, an invoice state machine 316, and the payment state machine 310. The subscription state machine 312 may include two transitions 314 that direct the workflow 304 to the invoice state machine 316, and the invoice state machine 316 may include one transition 318 that directs the workflow 304 to the payment state machine 310. One or more state machines may be shared by two or more workflows (e.g., the payment state machine 310), which may be reflected in the overview GUI 300 as a block spanning multiple workflows thereby allowing the merchant to more quickly understand how workflows may overlap and/or interact with each other.

From the overview GUI 300, the merchant may add, remove, or otherwise modify one or more workflows, state machines, and/or transitions. For example, the merchant may select (e.g., by clicking, touching, or any other user interaction) the payment state machine 310 to view information about the payment state machine 310 (e.g., upstream and downstream state machines as shown in panel 320) and/or launch a state machine GUI to view and/or configure the state machine directly. As another example, the merchant may also or instead select the transitions 314 to view information about the transitions in the B2B subscription state machine 312, such as which transitions of the B2B subscription state machine 312 direct the workflow 304 to the invoice state machine 316 as shown in panel 322. The merchant may also select a workflow to enter into a workflow GUI.

Figure 4:
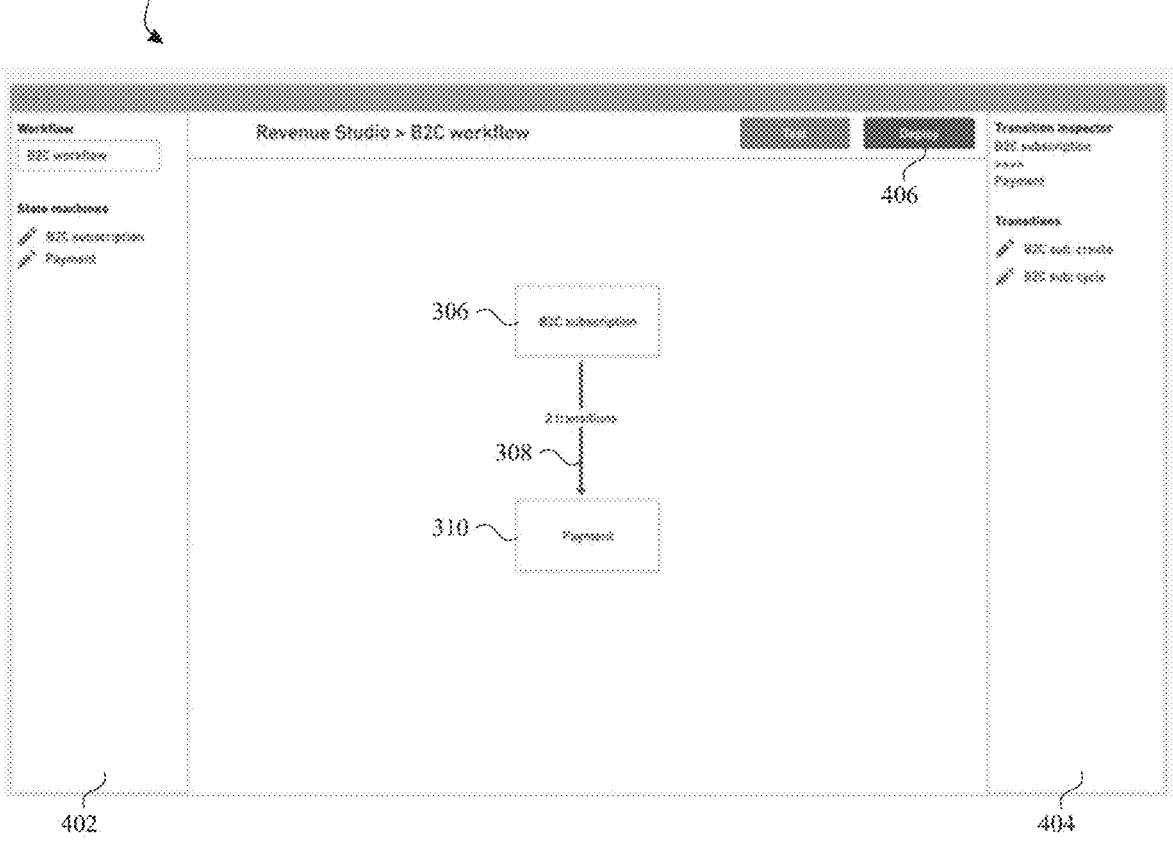
FIG. 4 depicts an example workflow graphical user interface, in accordance with one or more implementations.

FIG. 4 depicts an example workflow GUI 400 that enables a user to build a custom workflow by visually depicting each of the state machines in the workflow, in accordance with one or more implementations. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The service provider server 106 may generate and/or provide a workflow GUI 400 for creating, customizing, or otherwise modifying a particular workflow, such as the workflow 302. The workflow GUI 400 may include interactive graphical elements, minimizing the need for coding or technical expertise. The workflow GUI 400 allows a merchant to view and/or modify a particular workflow and/or components thereof (e.g., state machines) stored on the service provider server 106. The interactive aspect of the merchant GUI 400 allows non-technical users to customize the workflows and/or state machines thus allowing for more efficient development, updating, and maintenance of workflows.

The workflow GUI 400 may include a visual canvas where a merchant can construct and adjust the workflow 302 and/or components thereof using a variety of graphical elements (e.g., blocks, arrows, buttons, checkboxes, input fields, and the like). The graphical elements (e.g., the blocks of the B2C subscription state machine 306 and the payment state machine 310) of the workflow GUI 400 may be moved (e.g., dragged and dropped), checked, interconnected (e.g., by the arrow of transitions 308), or otherwise manipulated to define the logic of the workflow 302. In some implementations, the workflow GUI 400 may be the same as the overview GUI 300.

For example, as shown in FIG. 4, a merchant can customize a particular workflow 302 to automate the handling of digital events for B2C sales. Particularly, the state machines 306, 310 of the B2C workflow 302 may each be a set of states and transitions, which may be logically grouped into a state machine to represent a particular aspect of a workflow. Each state machine may include one or more states that each represent a specific condition or phase of the workflow. Associated with each state is at least one transition. Transitions may be important because they provide a conditional mechanism to move from one state to another. Each transition may include a triggering condition that, when satisfied, activates the transition (e.g., initiates the change of state), which may be important because it allows for conditional processing of events. Each transition may also include a transition action that delineates the specific operations or tasks to be executed when the transition is activated (e.g., the triggering conditions are satisfied), which may be important because it allows actions to be performed automatically and in contextually appropriate times. For example, the B2C subscription state machine 306 may include states that represent various statuses of a B2C subscription (e.g., pending, active, canceled, etc.) and transitions that define the movement between states, and the payment state machine 310 may include states that represent various statuses of a payment (e.g., initiated, cleared, settled, etc.) and transitions that define the movement between states. In some implementations, a state machine may be instantiated as part of a transition between states. For example, the B2C subscription state machine may include transitions 308 that direct the workflow from the B2C subscription state machine 306 to the payment state machine 310, such as when it comes time to renew a subscription. Rather than add payment states and transitions to the B2C subscription state machine 306, a separate payment state machine 310 may be utilized and can be used across a variety of workflows to reduce redundant work, such as adding the same payment states and transitions to workflows that include payment.

From the workflow GUI 400, the merchant may add, remove, or otherwise modify one or more state machines and/or transitions to customize the workflow. For example, the merchant may select the transitions 308 to view information about the transitions in the B2C subscription state machine 306, such as which transitions of the B2C subscription state machine 306 direct the workflow 302 to the payment state machine 310 as shown in panel 404. The merchant may also select a workflow to enter into a workflow GUI or a state machine to enter into a state machine GUI. For example, the merchant may select the payment state machine 310 from the workflow GUI 400 or from the panel 402 listing the state machines in the workflow 302 causing the merchant device to render a state machine GUI 500, described below.

In some implementations, while the merchant is interacting with the workflow GUI 400 to visually compose and configure their workflows, the application rendering the GUIs (e.g., the web browser) may translate these graphical representations into computer code based on code snippets associated with the graphical elements of the workflow GUI 400. This code generation may be dynamically generated and responsive to changes provided by the merchant (e.g., via the workflow GUI 400) thereby saving the merchant time in development and debugging. When the merchant has indicated that the workflow 302 is completed (e.g., by pressing the "deploy" button 406), the merchant device running the application may send a request to the service provider server 106 to integrate and/or deploy the computer code (e.g., into another codebase) to effectuate the functionality of the workflow 302.

In some implementations, when the merchant has indicated that the workflow 302 is completed (e.g., by pressing the "deploy" button 406), the merchant device running the application may send a request to the service provider server 106 to translate the graphical elements of the workflow GUI 400 into computer code based on code snippets associated with the graphical elements of the workflow 302. The service provider server 106 may also integrate and/or deploy the computer code (e.g., into another codebase) to effectuate the functionality of the workflow 302.

FIG. 5 depicts an example state machine GUI 500 for creating or modifying a state machine, in accordance with one or more implementations. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

A workflow 302 with at least one state machine 306 may become a framework for automatically handling specified events. A remote server (e.g., the service provider server 106) may be configured to handle events based on the workflow created by the merchant (e.g., via GUI 300, GUI 400, and/or GUI 500) and sent to the remote server. The remote server may receive a notification about the occurrence of an event from a merchant server (e.g., the merchant server 104). The remote server may identify a relevant workflow based on the event. For example, if the customer associated with the event is a consumer, the remote server may select the B2C workflow 302 when determining how to handle the event.

The remote server may then identify the current state of a state machine of the workflow and evaluate the transitions from the current state to any subsequent states. For example, if the current state is the "Active" state 508 and the event is a monthly subscription renewal, the remote server may evaluate triggering condition(s) of transitions 510, 512 to determine whether to move to the "Canceled" state 514. If the triggering conditions of a transition are satisfied by the event (e.g., by the attributes and/or details thereof), the current state may be updated to the subsequent state of the transition, which may be in the same state machine and/or in another state machine. If the triggering conditions of a transition are satisfied, the state machine may also perform one or more actions associated with the transition. The transition action may encompass a wide range of actions, ranging from local tasks (e.g., to update the workflow and/or components thereof) to remote tasks (e.g., transmitting a request for the merchant server 104 to update a record of the customer associated with the event). For example, if the triggering conditions of the "Cycle" transition 510 are satisfied, the current state may be updated to the "Active" state 508 and the payment state machine 310 may be initiated to process the payment of the subscription renewal.

Via the state machine GUI 500, the merchant can add/remove states. For example, the merchant can add an extra state between the "incomplete" state 504 and the "active" state 508 such as a "pending" state to define an additional status of a B2C subscription. Adding and/or removing states in a state machine triggers a change to the workflow allowing for greater flexibility and adaptability in handling different scenarios within a workflow (e.g., a scenario in which a subscription is pending, such as pending authorization) thereby saving time and efficiency in a developer having to build out each of these specific states in a complex codebase. When new states are added, the new states can encapsulate specific conditions or statuses that were not previously accounted for, enhancing the granularity and precision of the workflow, whereas removing states can simplify a workflow, making it more straightforward and easier to manage, such as when certain conditions are no longer relevant or required.

Via the state machine GUI 500, the merchant can add/remove transitions. For example, the merchant can add a transition from the "incomplete" state 504 to the new "pending" state and modify the "activate" transition 506 to link the "pending" state and the "active" state 508 to indicate what should be done when a particular event is received and what the status of the state machine should be as a consequence of the event. Like adding and/or removing states, adding and/or removing transitions may trigger a change to the workflow's behavior. Adding transitions enables more paths through the state machine, providing additional routes (e.g., transition actions) for handling various situations, which can lead to more robust and resilient workflows that can gracefully handle a wider array of scenarios. Removing transitions can help in enforcing specific workflows or ensuring that certain paths are not taken, which can be beneficial for maintaining data integrity, maintaining security in sensitive operations, and/or the like.

As shown in FIG. 5, the service provider server 106 may generate and/or provide a state machine GUI 500 for creating, customizing, or otherwise modifying a particular state machine, such as the B2C subscription state machine 306. The state machine GUI 500 may include interactive graphical elements, minimizing the need for coding or technical expertise. The state machine GUI 500 allows a merchant to view and/or modify a particular state machine and/or components thereof (e.g., states and transitions) stored on the service provider server 106. By providing a guided and structured interface for building the state machine, the state machine GUI 500 can help in reducing the likelihood of errors that might occur in a manually coded workflow thereby leading to more reliable and robust workflows. The interactive aspect of the state machine GUI 500 allows non-technical users to customize state machines thereby conserving development computing resources. The interactive aspects also provide added flexibility to perform modifications and updates to state machines without the need for delving into the code as well as improve scalability by promoting code reusability.

The state machine GUI 500 may include graphical elements that provide merchants with a visual canvas where they can construct and adjust the state machine 306 using a variety of graphical elements (e.g., nodes representing states and directional arrows or lines to represent transitions to/from/between states). The graphical elements (e.g., the circles of the states 504, 508, 514) of the state machine GUI 500 may be moved (e.g., dragged and dropped), checked, interconnected (e.g., by the arrows of transitions 502, 506, 510, 512), or otherwise manipulated to define the logic of the state machine 306. Additionally, the state machine GUI 500 may include context-sensitive tools and panels that provide merchants with options and parameters relevant to the selected state or transition. For example, the tools and panels may encompass dropdown menus to select specific conditions, text boxes to define action details, or visual prompts that guide merchants through the customization process. In some implementations, the state machine GUI 500 may be the same as the overview GUI 300 and/or the workflow GUI 400.

As shown in FIG. 5, the state machine 306 may be pre-defined or partially pre-defined and may be customizable by a merchant via the state machine GUI 500. Each state 504, 508, 514 may represent distinct phases, conditions, or statuses of the state machine 306. For example, in the context of the B2C workflow 302, a state could signify a particular phase in the billing cycle, such as "Incomplete," "Active," or "Canceled." Each transition 502, 506, 510, 512 may represent the progression or movement from one state to another (e.g., within the state machine 306). Each transition 502, 506, 510, 512 may be contingent upon an associated triggering condition, a pre-defined (e.g., merchant-defined) set of criteria or logical evaluation that, when satisfied by one or more attributes of a received event, causes the movement of the current state of the state machine to a subsequent state. For instance, if the current state of the state machine 306 is an "Incomplete" state, a transition from an "Incomplete" to an "Active" state might be triggered when a merchant server 104 initiates an event. Along with the triggering condition, transitions may be associated with transition actions. Transition actions are specific operations or tasks executed as part of the transition process. In the billing context, a transition action might encompass processes such as sending a notification to the merchant and/or a customer, updating the database with the latest billing status, or interacting with remote and/or third-party systems for payment processing.

One advantage of the state machine GUI 500 includes its capacity to allow merchants, even those without coding expertise, to directly interact with and modify the architecture of a state machine. For instance, a merchant may click on a node (state) to rename it, delete it, or add a new state, to conform the state machine with the desired behaviors of the corresponding workflow. Similarly, transitions can be edited by manipulating the connecting arrows or lines and enabling merchants to define or modify triggering conditions and associated transition actions via graphical elements (e.g., in panel 524) in the state machine GUI 500.

For example, as shown in FIG. 5, the transition 510 is selected causing the panel 524 to display options for modifying attributes of the transition 510. The panel 524 may display a text field 516 for the transition name ("cycle"), a dropdown menu 517 to select options for triggering conditions (e.g., automatic, user-based, timer based, etc.), a text field 518 for pre-conditions (e.g., custom expressions for defining the triggering conditions), a dropdown menu 520 to select a child state machine (e.g., to transition into as represented by transitions 308), and a text field 522 to define the conditions for which to launch the child state machine.

Merchants may input a fully customizable expression to define conditions, such as, for defining the triggering condition (e.g., at text field 518) and for defining when to launch another state machine (e.g., at text field 522). Custom expressions may be based on simplified expression evaluation languages, such as Common Expression Language (CEL) or regular expressions (regex). Custom expressions are beneficial because they allow merchants to define conditions and logic in a more detailed and customized manner, thereby allowing the merchant to address a broader range of scenarios that might not be covered by pre-defined or partially pre-defined conditions presented to the merchant as interactive elements in the state machine GUI 500. The syntax of custom expressions, like CEL, may be closer to natural language and mathematical notation, making it more accessible to merchants who might not have a coding background and saving merchants the time and cost of engineering a complex codebase to perform similar tasks. For instance, instead of selecting a pre-defined triggering condition of "monthly," a merchant might use a custom expression to specify a triggering condition like "monthly when the merchant is not overdue more than two months and has logged in within the past month."

In some implementations, the state machine GUI 500 that supports custom expressions may include features such as syntax highlighting, auto-suggestions, and real-time error checking to guide merchants as they create expressions, and to help verify accuracy and reduce the likelihood of mistakes in the expressions created by merchants. Improving accuracy and reducing mistakes in custom expressions allows for rapid prototyping without the need for a full compilation of a codebase, thereby leading to shorter development cycles and reducing development computing needs.

In some implementations, the state machine GUI 500 may support tooltips and inline documentation to provide context and clarification in creating or modifying states and transitions.

Once the state machine 306 is defined, merchants may have options to save, test, or deploy the state machine 306, to verify that the state machine 306 may be properly integrated into the workflow 302.

In some implementations, while the merchant is interacting with the state machine GUI 500 to visually compose and configure their state machines, the web application rendering the GUIs (e.g., via web browser), and/or the server (e.g., the service provider server 106) hosting the web applications, may translate these graphical representations into computer code based on code snippets associated with the graphical elements of the state machine GUI 500. When the merchant has indicated that the state machine 306 is completed (e.g., by pressing the "deploy" button 526), the merchant device running the application may send a request to the service provider server 106 to integrate and/or deploy the computer code (e.g., into another codebase) to effectuate the functionality of the state machine 306.

In some implementations, when the merchant has indicated that state machine 306 is completed (e.g., by pressing the "deploy" button 526), the merchant device running the application may send a request to the service provider server 106 to translate the graphical elements of the state machine GUI 500 into computer code based on code snippets associated with the graphical elements of the state machine 306. The service provider server 106 may also integrate and/or deploy the computer code (e.g., into another codebase) to effectuate the functionality of the state machine 306.

Figure 6:
FIG. 6 depicts an example textual user interface, in accordance with one or more implementations.

FIG. 6 depicts an example textual user interface (textual UI 600), in accordance with one or more implementations. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The service provider server 106 may generate and/or provide a textual UI 600 for creating, customizing, or otherwise modifying a particular state machine, such as the B2C subscription state machine 306. The textual UI 600 provides an environment where merchants can input textual commands, scripts, domain-specific languages (DSL), and/ or the like, tailored for state machine definitions that directly correspond with visual elements in a corresponding graphical user interface (e.g., the state machine GUI 500). Through textual commands or scripts, merchants can define states, specify transitions between states, delineate the conditions under which such transitions occur, and/or the like. For instance, a merchant might input code to define an "Active"

state in a subscription state machine of a billing workflow and then specify the conditions under which a transition to an "Active" or "Canceled" state might occur.

Moreover, in the text-based environment, merchants can employ logical constructs, loops, conditional statements, and even integrate external data sources or functions, enabling further control of the state machine's behavior. Advanced users can intricately tailor the workflow to handle nuanced scenarios, errors, or edge cases that might be challenging to address in a purely graphical interface. The code entered in textual UI 600 may directly correlate to configurations in a GUI counterpart (e.g., state machine GUI 500), enabling synchronization between the two. Thus, merchants may visualize their state machine in a graphical interface after defining it textually, or vice versa, verifying the logic entered operates as envisioned.

In some implementations, the textual UI 600 may support features like code highlighting, syntax checking, and auto-completion to facilitate the coding process and minimize errors that might arise from manual input.

FIG. 7 depicts a flow diagram of an example process 700 for generating one or more revenue recovery workflows, in accordance with one or more implementations. For explanatory purposes, the process 700 is primarily described herein with reference to the electronic device 102, the merchant server 104, and the service provider server 106 of FIG. 1. However, the process 700 is not limited to the electronic device 102, the merchant server 104, and the service provider server 106, and one or more blocks of the process 700 may be performed by one or more other by other suitable devices. Further, for explanatory purposes, the blocks of the process 700 are described herein as occurring sequentially or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a billing service (e.g., running on the service provider server 106) may receive a request from a merchant device (e.g., the electronic device 102). The request may prompt the billing service to generate an event-based workflow (e.g., the workflow 302). The workflow may be associated with one or more event types, such as events related to billing, payments, fulfillment, and/or the like.

The workflow may include one or more state machines. Within a state machine, there may be one or more states that each represent a specific condition or phase of the workflow. Associated with each state is at least one transition, which provides a mechanism to move from one state to another. Each transition may include a triggering condition that, when satisfied, activates the transition (e.g., initiates the change of state). For example, the triggering condition may include a custom conditional expression (e.g., a CEL expression) input by a merchant via a graphical user interface. Each transition may also include a transition action that delineates the specific operations or tasks to be executed when the transition is activated (e.g., the triggering conditions are satisfied). For example, transition actions may include generating another event and transmitting the other event to the same or another device for triggering another workflow. Transition actions may also include transmitting at least part of the event to another device (e.g., a remote device) for a decentralized and distributed approach to payment processing, wherein certain tasks can be offloaded from the originating system to another device, optimizing resource usage and potentially leveraging specialized capabilities of the remote device for specific processing goals. Transition actions may also include transmitting a request to the remote device based on the event (e.g., to request a quick response (QR) code from a government entity for an e-invoice based on a completed transaction) and receiving another payment from the remote device (e.g., the QR code representing the e-invoice of the completed transaction).

The billing service may generate one or more interactive graphical user interfaces that, for example, can be sent to and run on a merchant's web browser, and/or within an application, and from which the merchant may provide the information to the billing service to configure one or more automated billing workflows (e.g., via the request). The request may be generated by and sent from a merchant device (e.g., the electronic device 102) based on the information input into the graphical user interfaces.

A graphical user interface (e.g., the overview GUI 300) may be generated by the billing service for the merchant to view and/or modify (e.g., create or destroy) one or more billing workflows and attributes thereof (e.g., metadata such as the name of the workflow or components such as the state machines). Another or the same graphical user interface (e.g., the workflow GUI 400) may be generated by the billing service for the merchant to view and/or modify one or more state machines within a particular billing workflow and attributes thereof (e.g., metadata such as the name of the state machine or components such as the states and transitions). Another or the same graphical user interface (e.g., the state machine GUI 500) may be generated by the billing service for the merchant to view and/or modify one or more states and/or transitions within a particular state machine and attributes thereof (e.g., metadata such as the name of the transitions or components such as the triggering condition and the transition action). In some implementations, the one or more graphical user interfaces may coincide with a text-based interface for defining the workflow or aspects thereof via code, DSLs, or other text.

When merchants engage with a graphical user interface, their interactions may be facilitated by interactive graphical elements such as buttons, toggles, dropdown menus (e.g., dropdown menu 517), text fields (e.g., text field 518), drag-and-drop elements (e.g., states 504, 508, 514), and the like. For example, transition actions may be selected by clicking a check box and may be prioritized by dragging the action ahead of another action. As merchants interact with the graphical user interface to construct workflows and/or state machines, the resulting graphical elements defining the workflows and/or state machines may be associated with respective code snippets, which may be viewed in a corresponding textual user interface (e.g., textual UI 600). In some implementations, the code snippets may be compiled, translated, or otherwise utilized in defining the behavior of the billing service. The underlying code snippets may ultimately be deployed and executed by the service provider server 106 to effectuate the functionality of the workflows and/or state machines.

At block 704, once the merchant has designed the workflow (e.g., including one or more state machines) via a user interface (e.g., a graphical user interface) and the corresponding request has been received by the billing service and/or another service of the service provider server 106, the billing service may process the request to construct and/or modify the billing workflow (e.g., at the service provider server 106). The workflow, now defined or refined based on the received request, may become the framework for how the billing service responds to specified events.

In some implementations, the request may include the code snippets, or representations thereof, from block 702. The service provider server 106 may integrate the code snippets into another codebase (e.g., the codebase of the billing service). Integration may include compiling the code snippets, resolving dependencies, and verifying compatibility with existing modules and services. The integration may be automated with deployment mechanisms such as continuous integration and continuous deployment pipelines. Additionally, the service provider server 106 may offer version control, code rollback, and/or gradual rollout capabilities, enabling merchants to safely experiment with their workflows and revert to previous states.

At block 706, the billing service may receive an indication (e.g., a message, signal, notification, etc.) about the occurrence of an event, which may be specified events relating to one or more transactions involving the merchant server.

The billing service may be in a listening state, awaiting indications that an event has transpired. The indication may include data that provides context and/or details about the event. The indication may include an event type that provides a broad categorization of the event, as indicated by metadata of the event or inferred from the event itself. The indication may also include a set of attributes that offer more details about the event. For example, the billing service may receive an indication that an invoice is due, and the indication includes data indicating the services provided and the amount of money exchanged for such services and that the indication is related to invoicing.

A source of the indication may be the merchant server, which may be a central hub managing and processing transactional activities related to the sale of goods or services for the merchant. When the merchant server detects an event that qualifies as an event of a specified type, the merchant server may package the relevant information and transmit the package to the billing service. The transmission may be facilitated through secure communication channels, which may employ protocols such as APIs or webhooks, ensuring that the data exchange is timely and reliable.

Another source of the indication may be the service provider server on which the billing service is running. For example, some events may be generated according to a timer (e.g., for recurring events) or according to another state machine.

At block 708, the billing service may identify a workflow by which the event may be processed. The billing service may compare the event type of the event with the event types of the workflows associated with the merchant from which the event was received. Once a matching event type is found, the billing service may identify a state machine of the workflow by which the event may be processed. If a workflow is not found, the billing service may utilize a default workflow, which may be pre-defined or defined by the merchant.

At block 710, the billing service may identify the current state of the identified state machine. One or more transitions may stem from the current state, each of which has its own set of triggering conditions. The billing service may evaluate the triggering conditions of the transitions associated with the current state of the state machine. If the triggering conditions of a transition are satisfied by the attributes and/or details of the event, the state machine may update the current state to the subsequent state of the transition, which may be in the same state machine and/or in another state machine. If the triggering conditions of a transition are satisfied by the attributes and/or details of the event, the state machine may also perform one or more actions associated with the transition. The transition action may encompass a wide range of actions, ranging from local tasks (e.g., to update the workflow and/or components thereof) to remote tasks (e.g., transmitting a request for the merchant server 104 to update a record of the customer associated with the event). For instance, if the transition 506 changes the state of a B2C subscription state machine 306 from an incomplete state 504 to an active state 508, a transition action may include transmitting an indication to the merchant server 104 that the customer has an active subscription and may access a service provided by the merchant server 104.

In some implementations, the merchant may utilize one or more user interfaces (e.g., graphical user interface provided by the service provider server 106) on a merchant device (e.g., the electronic device 102) to create, remove, or otherwise modify workflows, state machines, states, and/or transitions causing the merchant device to transmit one or more requests to the billing service (e.g., the service provider server 106). The billing service may create, remove, or otherwise modify workflows, state machines, states, and/or transitions according to the requests.

Figure 8:
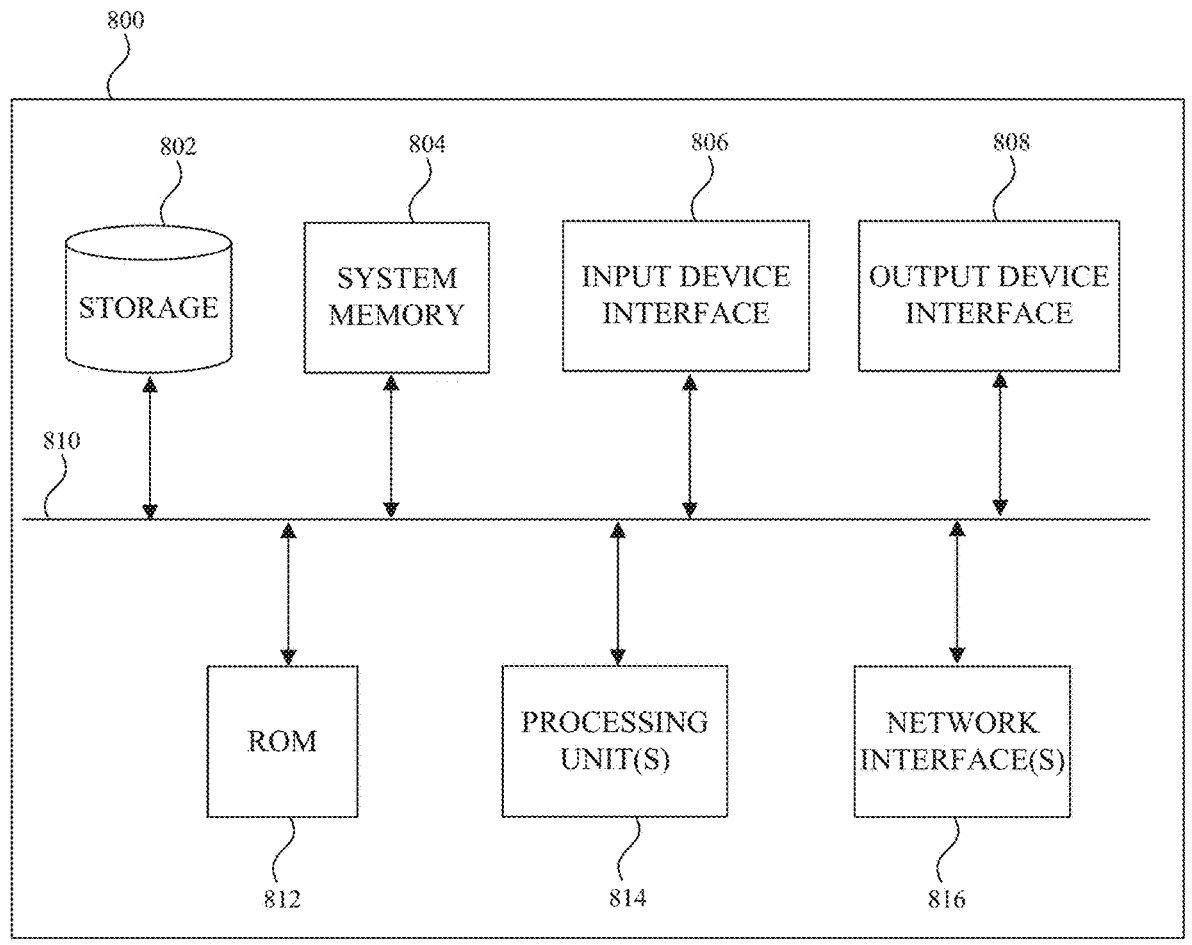
FIG. 8 depicts an example electronic system with which aspects of the present disclosure may be implemented, in accordance with one or more implementations.

FIG. 8 depicts an example electronic system 800 with which aspects of the present disclosure may be implemented, in accordance with one or more implementations. The electronic system 800 can be, and/or can be a part of, any electronic device for generating the features and processes described in reference to FIGS. 1-7, including but not limited to a laptop computer, tablet computer, smartphone, and wearable device (e.g., smartwatch, fitness band). The electronic system 800 may include various types of computer-readable media and interfaces for various other types of computer-readable media. The electronic system 800 includes one or more processing unit(s) 814, a persistent storage device 802, a system memory 804 (and/or buffer), an input device interface 806, an output device interface 808, a bus 810, a ROM 812, one or more processing unit(s) 814, one or more network interface(s) 816, and/or subsets and variations thereof.

The bus 810 collectively represents all system, peripheral, and chipset buses that communicatively connect the numerous internal devices of the electronic system 800. In one or more implementations, the bus 810 communicatively connects the one or more processing unit(s) 814 with the ROM 812, the system memory 804, and the persistent storage device 802. From these various memory units, the one or more processing unit(s) 814 retrieves instructions to execute and data to process in order to execute the processes of the subject disclosure. The one or more processing unit(s) 814 can be a single processor or a multi-core processor in different implementations.

The ROM 812 stores static data and instructions that are needed by the one or more processing unit(s) 814 and other modules of the electronic system 800. The persistent storage device 802, on the other hand, may be a read-and-write memory device. The persistent storage device 802 may be a non-volatile memory unit that stores instructions and data even when the electronic system 800 is off. In one or more implementations, a mass-storage device (such as a magnetic or optical disk and its corresponding disk drive) may be used as the persistent storage device 802.

In one or more implementations, a removable storage device (such as a floppy disk, flash drive, and its corresponding disk drive) may be used as the persistent storage device 802. Like the persistent storage device 802, the system memory 804 may be a read-and-write memory device. However, unlike the persistent storage device 802, the system memory 804 may be a volatile read-and-write memory, such as RAM. The system memory 804 may store any of the instructions and data that one or more processing unit(s) 814 may need at runtime. In one or more implementations, the processes of the subject disclosure are stored in the system memory 804, the persistent storage device 802, and/or the ROM 812. From these various memory units, the one or more processing unit(s) 814 retrieves instructions to execute and data to process in order to execute the processes of one or more implementations.

The bus 810 also connects to the input device interfaces 806 and output device interfaces 808. The input device interface 806 enables a user to communicate information and select commands to the electronic system 800. Input devices that may be used with the input device interface 806 may include, for example, alphanumeric keyboards, touch screens, and pointing devices. The output device interface 808 may enable the electronic system 800 to communicate information to users. For example, the output device interface 808 may provide the display of images generated by electronic system 800. Output devices that may be used with the output device interface 808 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 810 also couples the electronic system 800 to one or more networks and/or to one or more network nodes through the one or more network interface(s) 816. In this manner, the electronic system 800 can be a part of a network of computers (such as a local area network, a wide area network, an intranet, or a network of networks, such as the internet). Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to micropro-cessors or multi-core processors that execute software, one or more implementations are performed by one or more integrated circuits, such as ASICs or FPGAs. In one or more implementations, such integrated circuits execute instruc-tions that are stored on the circuit itself.

Those of skill in the art would appreciate that the various illustrative blocks, modules, elements, components, meth-ods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design con-straints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be re-arranged, or that all illustrated blocks be performed. Any of the blocks may be performed simultaneously. In one or more implementations, multitask-ing and parallel processing may be advantageous. Moreover, the separation of various system components in the imple-mentations described above should not be understood as requiring such separation in all implementations, and it should be understood that the described program compo-nents and systems can generally be integrated together into a single software product or packaged into multiple software products.

As used in this specification and any claims of this application, the terms "base station," "receiver," "com-puter," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being pro-grammed to monitor and control the operation or the pro-cessor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, an embodiment, the embodiment, another embodiment, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relat-ing to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedi-cated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:

providing, by a server to a client device, for display at a graphical user interface of the client device, an interface illustrating one or more state machines associated with event-based workflows for processing events received by the server, the one or more state machines each including one or more states, corresponding transitions between the one or more states, and triggering conditions associated with each of the corresponding transitions, the graphical user interface including one or more drag-and-drop elements, wherein the triggering conditions specify when one state transitions to another state and provide one or more actions to be performed by the server that correspond to the transitioning, wherein the one or more states and the corresponding transitions are associated with respective code snippets for automatic code generation;

receiving, by the server from the client device via the graphical user interface, prioritized transition actions corresponding to the one or more actions to be performed by the server, wherein a prioritization of the prioritized transition actions are determined by an order of the one or more drag-and-drop elements;

receiving a request, from the client device via the provided interface, to generate an event-based workflow associated with a first event type, wherein the event-based workflow comprises a state machine that includes at least a state and an associated transition to a next state, the transition comprising a user-defined triggering condition and a transition action, wherein the user-defined triggering condition is generated via the provided interface for customizing at least one of the corresponding triggering conditions by a no-code modification of the triggering conditions using the one or more drag-and-drop elements of the graphical user interface;

generating and storing the event-based workflow comprising the state machine based at least in part on the request by translating the one or more states and the corresponding transitions into executable computer code using the respective code snippets;

receiving, by the server, an event including an event type and an event attribute; and in accordance with determining that the event type corresponds to the first event type of the event-based workflow and that the event attribute satisfies the user-defined triggering condition associated with a current state of the event-based workflow, and when the current state of the event-based workflow corresponds to the state, performing the transition action of the transition, the transition action including offloading at least part of the event to another device for distributed processing, and updating the current state of the event-based workflow to the next state based at least in part on the performed transition action.

2. The method of claim 1, further comprising:

receiving a second request to generate and add a new transition to the state machine, wherein the new transition is associated with a second state of the state machine, wherein the second request is provided via the graphical user interface of the client device; and generating and adding the new transition to the state machine based at least in part on the second request.

3. The method of claim 1, further comprising:

receiving a second request to modify the transition, wherein the second request is provided via the graphical user interface of the client device; and modifying the transition based at least in part on the second request.

4. The method of claim 1, further comprising:

receiving a second request to generate and add a new state to the state machine, wherein the second request is provided via the graphical user interface of the client device; and generating and adding the new state to the state machine based at least in part on the second request.

5. The method of claim 1, further comprising:

receiving a second request to modify the state of the state machine, wherein the second request is provided via the graphical user interface of the client device; and modifying the state of the state machine based at least in part on the second request.

6. The method of claim 1, wherein the transition action comprises generating a second event and transmitting the second event to a remote device.

7. The method of claim 1, wherein the transition action comprises:

transmitting a second request to a remote device based on the event; and receiving a second event from the remote device.

8. The method of claim 1, wherein the user-defined triggering condition comprises a conditional expression corresponding to a no-code input by a user via the graphical user interface.

9. The method of claim 1, further comprising:

translating, by the server, the user-defined triggering condition into machine-executable code based on code snippets associated with graphical elements of the interface.

10. An electronic device comprising:

a memory; and a processor configured to:

provide, for display at a graphical user interface of a client device, an interface illustrating one or more state machines associated with event-based workflows for processing events received by the electronic device, the one or more state machines each including one or more states, corresponding transitions between the one or more states, and triggering conditions associated with each of the corresponding transitions, the graphical user interface including one or more drag-and-drop elements, wherein the triggering conditions specify when one state transitions to another state and provide one or more actions to be performed by the electronic device that correspond to the transitioning, wherein the one or more states and the corresponding transitions are associated with respective code snippets for automatic code generation;

receive, from the client device via the graphical user interface, prioritized transition actions corresponding to the one or more actions to be performed by the electronic device, wherein a prioritization of the prioritized transition actions are determined by an order of the one or more drag-and-drop elements;

receive a request, from the client device via the provided interface, to generate an event-based workflow associated with a first event type, wherein the event-based workflow comprises a state machine that includes at least a state and an associated transition to a next state, the transition comprising a user-defined triggering condition and a transition action, wherein the user-defined triggering condition is generated via the provided interface for customizing at least one of the corresponding triggering conditions by a no-code modification of the triggering conditions using the one or more drag-and-drop elements of the graphical user interface;

generate and store the event-based workflow comprising the state machine based at least in part on the request by translating the one or more states and the corresponding transitions into executable computer code using the respective code snippets;

receive an event including an event type and an event attribute; and in accordance with determining that the event type corresponds to the first event type of the event-based workflow and that the event attribute satisfies the user-defined triggering condition associated with a current state of the first event-based workflow, and when the current state of the event-based workflow corresponds to the state, perform the transition action of the transition, the transition action including off-loading at least part of the event to another device for distributed processing, and update the current state of the event-based workflow to the next state based at least in part on the performed transition action.

11. The electronic device of claim 10, wherein the processor is further configured to:

receive a second request to generate and add a new transition to the state machine, wherein the new transition is associated with a second state of the state machine, wherein the second request is provided via the graphical user interface of the client device; and generate and add the new transition to the state machine based at least in part on the second request.

12. The electronic device of claim 10, wherein the processor is further configured to:

receive a second request to modify the transition, wherein the second request is provided via the graphical user interface of the client device; and modify the transition based at least in part on the second request.

13. The electronic device of claim 10, wherein the processor is further configured to:

receive a second request to generate and add a new state to the state machine, wherein the second request is provided via the graphical user interface of the client device; and generate and add the new state to the state machine based at least in part on the second request.

14. The electronic device of claim 10, wherein the processor is further configured to:

receive a second request to modify the state of the state machine, wherein the second request is provided via the graphical user interface of the client device; and modify the state of the state machine based at least in part on the second request.

15. The electronic device of claim 10, wherein the user-defined triggering condition comprises a conditional expression corresponding to a no-code input by a user via the graphical user interface.

16. A non-transitory computer-readable medium comprising:

computer-readable instructions that, when executed by a processor, cause the processor to perform one or more operations comprising:

providing, for display at a graphical user interface of a client device, an interface illustrating one or more state machines associated with event-based workflows for processing events received by a server, the one or more state machines each including one or more states, corresponding transitions between the one or more states, and triggering conditions associated with each of the corresponding transitions, the graphical user interface including one or more drag-and-drop elements, wherein the triggering conditions specify when one state transitions to another state and provide one or more actions to be performed by the server that correspond to the transitioning, wherein the one or more states and the corresponding transitions are associated with respective code snippets for automatic code generation;

receiving, from the client device via the graphical user interface, prioritized transition actions corresponding to the one or more actions to be performed by the server, wherein a prioritization of the prioritized transition actions are determined by an order of the one or more drag-and-drop elements;

receiving a request, from the client device via the provided interface, to generate an event-based workflow associated with a first event type, wherein the event-based workflow comprises a state machine that includes at least a state and an associated transition to a next state, the transition comprising a user-defined triggering condition and a transition action, wherein the user-defined triggering condition is generated via the provided interface for customizing at least one of the corresponding triggering conditions by a no-code modification of the triggering conditions using the one or more drag-and-drop elements of the graphical user interface;

generating and storing the event-based workflow comprising the state machine based at least in part on the request by translating the one or more states and the corresponding transitions into executable computer code using the respective code snippets;

receiving, by the server, an event including an event type and an event attribute; and in accordance with determining that the event type corresponds to the first event type of the event-based workflow and that the event attribute satisfies the user-defined triggering condition associated with a current state of the event-based workflow, and when the current state of the event-based workflow corresponds to the state, performing the transition action of the transition, the transition action including off-loading at least part of the event to another device for distributed processing, and updating the current state of the event-based workflow to the next state based at least in part on the performed transition action.

17. The non-transitory computer-readable medium of claim 16, further comprising:

receiving a second request to generate and add a new transition to the state machine, wherein the new transition is associated with a second state of the state machine, wherein the second request is provided via the graphical user interface of the client device; and generating and adding the new transition to the state machine based at least in part on the second request.

18. The non-transitory computer-readable medium of claim 16, further comprising:

receiving a second request to modify the transition, wherein the second request is provided via the graphical user interface of the client device; and modifying the transition based at least in part on the second request.

19. The non-transitory computer-readable medium of claim 16, further comprising:

receiving a second request to generate and add a new state to the state machine, wherein the second request is provided via the graphical user interface of the client device; and generating and adding the new state to the state machine based at least in part on the second request.

20. The non-transitory computer-readable medium of claim 16, wherein the user-defined triggering condition comprises a conditional expression corresponding to a no-code input by a user via the graphical user interface.

*  *  *  *  *